Sept. 16, 1958   W. TISCHBEIN   2,852,413
METHOD OF COATING RUBBERY MATERIALS
Filed June 16, 1955
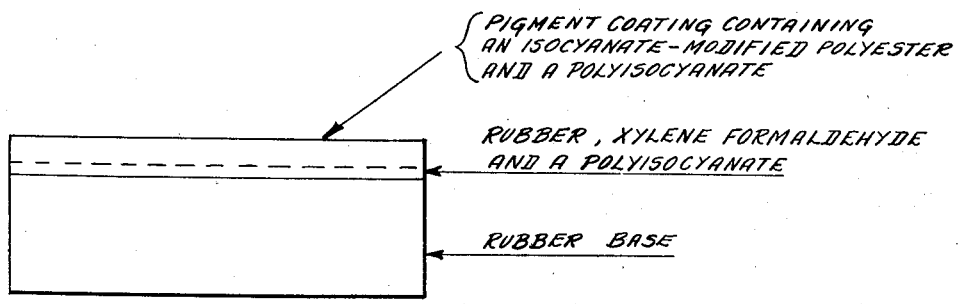
INVENTOR:
WILHELM TISCHBEIN
By Clell W. Upchurch
ATTORNEY.

United States Patent Office 2,852,413
Patented Sept. 16, 1958

2,852,413

METHOD OF COATING RUBBERY MATERIALS

Wilhelm Tischbein, Leverkusen, Germany, assignor to Farbenfabriken Bayer Aktiengesellschaft, Leverkusen, Germany, a corporation of Germany Application June 16, 1955, Serial No. 516,041

Claims priority, application Germany June 18, 1954

14 Claims. (Cl. 117—72)

This invention relates to lacquered rubber articles and a process for producing same.

It has been tried before to apply a lacquer to various objects such as air-filled rubber tires especially to their side-walls. Such coatings have not met the requirements heretofore, since the adherent property of the pigment-containing lacquer was insufficient on the rubber surface. Upon heavy use, especially in the presence of heat, the applied lacquer became brittle and cracked off.

It is the object of the present invention to overcome the difficulties of the prior art by coating the surface of the rubbery materials with a solution of a mixture comprising a natural or synthetic rubber, a xyleneformaldehyde resin and a di- or polyisocyanate, then upon drying, applying a solution containing a pigment, a still soluble isocyanate-modified hydroxyl polyester and an additional amount of a di- or polyisocyanate required for the cross-linking of the aforementioned polyester.

In accordance with the invention, the first or basic layer to be applied comprises a synthetic rubber plasticized with a xyleneformaldehyde resin and also a di- or polyisocyanate as an adhesive, e. g. toluylene diisocyanate, p-phenylene diisocyanate, triphenylmethane triisocyanate. The rubber surface is coated with this basic layer in any desired manner, for example by brushing on or by spraying. Upon drying, this basic layer is preferably allowed to stand overnight, whereupon the pigment-containing coating is applied thereto. The latter comprises a solution of a reaction product of a hydroxyl polyester and a di- or polyisocyanate. The hydroxyl polyester is prepared in the usual way by thermal condensation at 150–220° and then reacted with up to 99% of the theoretical amount of a diisocyanate, such as toluylene diisocyanate and hexamethylene diisosyanate to form an isocyanate-modified polyester known in the art. The solution of such an isocyanate-modified polyester may be pigmented in any desired way, for example with inorganic pigments such as titanium dioxide, zinc oxide, iron oxide or cadmium oxide. Alternatively, organic pigments, such as phthalocyanine and similar compounds may also be employed. To this solution, a further amount of a di- or polyisocyanate is added to permit cross-linking of the modified polyester, and the entire composition is applied in any desired manner to the slightly pre-roughened rubbery surface. The amount of di- or polyisocyanate added to permit cross-linking may range from 5–25% based on the weight of polyester originally employed, 12–25% of toluylene diisocyanate or 5–15% of diphenylene dimethyl methane diisocyanate or 4,4'-diphenylmethane diisocyanate are preferably used to achieved cross-linking. The coating can be applied in several layers.

In accordance with the present invention, I have made the surprising discovery that it is possible to prepare coatings for air-filled rubber tires which are maintained practically throughout the entire life of said air-filled tires. Moreover, the final coating can in case of damage be renewed at any time with good adhering property. The invention is illustrated but not limited by the following examples.

Example 1

To the cleaned or slightly pre-roughened surface of the side-walls of a rubber tire an adherent coating of the following composition is applied:

A synthetic rubber copolymer to which 10–25% xyleneformaldehyde resin was added on mixing rollers, was dissolved in methylethylketone to form a 20% solution of the mixture. This was followed by the addition of 5–15% of a 20% solution of triphenylmethanetriisocyanate. Upon application, this coating is allowed to dry overnight whereupon 1 to 3 coats of the following solution are applied by brushing or spraying:

100 grams of a hydroxyl polyester prepared from 3 mols of adipic acid, 2 mols butyleneglycol and 2 mols trimethylolpropane by thermal condensation at 150–220° and precondensed with toluylene diisocyanate are pigmented with 20–40% titanium dioxide and diluted with 25 grams of ethylacetate; then 1 gram of a 20% solution of isophthalylchloride in butylacetate and 10–20 grams toluylene diisocyanate are added. The final condensation is carried out at ordinary temperature.

Example 2

The pre-treatment of the rubber tire is carried out as in Example 1. After application of the basic layer, it is allowed to dry overnight and 1 to 3 coats of the following solution are applied by spraying or brushing: 100 grams of a hydroxyl polyester prepared from 3 mols of adipic acid, 3 mols of butyleneglycol and 1 mol of trimethylolpropane and precondensed with toluylene diisocyanate, is pigmented with 20–40% iron oxide and diluted with 25% ethylacetate, whereupon 1 gram of 20% solution of isophthalylchloride in butylacetate and 10–20 grams of 4,4'-diphenylene dimethylmethane diisocyanate are added. The final condensation is carried out at ordinary temperature.

Example 3

The initial treatment of the rubber tires is effected as in Example 1. After being coated, the tire is left to dry overnight and is then brushed or sprayed one to three times with the following solution: 100 grams of a hydroxyl polyester of 3 moles of adipic acid, 3 moles of butylene glycol and 1 mol of trimethylol propane are initially condensed with hexamethylene diisocyanate and pigmented with 20–40% of manganese blue, diluted with 25% of ethyl acetate and 1 g. of a 20% solution of isophthalyl chloride in butyl acetate and 10 to 20 g. of toluylene diisocyanate are added. The final condensation is effected at ordinary temperature.

Example 4

The initial treatment of the rubber tire is carried out as in Example 1. After being coated, the tire is left to dry overnight and it is then brushed or sprayed once to three times with the following solution: 100 grams of a hydroxyl polyester of 3 moles of adipic acid, 2 moles of butylene glycol and 2 moles of trimethylol propane are initially condensed with hexamethylene diisocyanate and pigmented with hydrated chromic oxide green, diluted with 25% of ethyl acetate and 1 g. of a 20% solution of isophthalyl chloride in butyl acetate and 10–20 g. of 4,4'-diphenyl methane diisocyanate are added. It is finally condensed under infra-red irradiation.

What is claimed is:

1. A process for coating rubber articles, which comprises coating said articles with a solution of a mixture comprising from about 75 to about 90 percent of a rubber, from about 10 to about 25 percent of a xyleneformaldehyde resin, and from about 5 to about 15 percent of a solution containing about 20% of a polyisocyanate, drying said coating, and applying to said dried coating another coating comprising a paste containing from about 20 to about 40 percent of a pigment, from about 60 to about 80 percent of a still soluble isocyanate-modified hydroxyl polyester and from about 5 to about 25 percent of polyisocyanate for effecting cross-linking of said polyester.

2. A process for coating the sidewalls of rubber tires, which comprises coating said sidewalls with a solution of a mixture comprising from about 75 to about 90 percent of a rubber, from about 10 to about 25 percent of a xyleneformaldehyde resin, and from about 5 to about 15 percent of a solution containing about 20% of a polyisocyanate, drying said coating, and applying to said dried coating another coating comprising a paste containing from about 20 to about 40 percent of a pigment, from about 60 to about 80 percent of a still soluble isocyanate-modified hydroxyl polyester and from about 5 to 25 percent of polyisocyanate for effecting cross-linking of said polyester.

3. A process for coating the sidewalls of rubber tires as defined in claim 2, wherein the product obtained by modifying a hydroxyl polyester derived from 3 mols of adipic acid, 2 mols of butylene glycol and 2 mols of trimethylolpropane with toluylene diisocyanate and reacting the modified hydroxyl polyester with toluylene diisocyanate is employed as the second coating.

4. A process for coating the sidewalls of rubber tires as defined in claim 2, wherein the product obtained by modifying a hydroxyl polyester derived from 3 mols of adipic acid, 3 mols of butylene glycol and 1 mol of trimethylolpropane with toluylene diisocyanate and reacting the modified hydroxyl polyester with 4,4'-diphenylene dimethylmethane diisocyanate is employed as the second coating.

5. A process for coating the sidewalls of rubber tires as defined in claim 2, wherein the product obtained by modifying a hydroxyl polyester derived from 3 mols of adipic acid, 3 mols of butylene glycol and 1 mol of trimethylolpropane with hexamethylene diisocyanate and reacting the modified hydroxyl polyester with toluylene diisocyanate is employed as the second coating.

6. A process for coating the sidewalls of rubber tires as defined in claim 2, wherein the product obtained by modifying a hydroxyl polyester derived from 3 mols of adipic acid, 3 mols of butylene glycol and 1 mol of trimethylolpropane with toluylene diisocyanate and reacting the modified hydroxyl polyester with 4,4'-diphenylmethane diisocyanate is employed as the scond coating.

7. A process for coating the sidewalls of rubber tires as defined in claim 2, wherein titanium oxide is the pigment employed.

8. A process for coating the sidewalls of rubber tires as defined in claim 2, wherein iron oxide is the pigment employed.

9. A process for coating the sidewalls of rubber tires as defined in claim 2, wherein manganese blue is the pigment employed.

10. A process for coating the sidewalls of rubber tires as defined in claim 2, wherein hydrated chromic oxide is the pigment employed.

11. A method for lacquering rubber which comprises applying to the surface thereof a solution containing from about 75% to about 90% rubber, from about 10% to about 25% xylene formaldehyde resin and from about 5% to about 15% of a solution containing from 20% polyisocyanate, drying the lacquer, applying on the dried lacquer a paste containing from about 20% to about 40% pigment, from about 60% to about 80% isocyanate-modified hydroxyl polyester as a solute, and from about 5% to about 25% polyisocyanate.

12. A method for lacquering the side walls of rubber tires which comprises applying to the surface thereof a solution containing from about 75% to about 90% rubber, from about 10% to about 25% xylene formaldehyde resin and from about 5% to about 15% of a solution containing about 20% polyisocyanate, drying the lacquer, applying on the dried lacquer a paste containing from about 20% to about 40% pigment, from about 60% to about 80% isocyanate-modified hydroxyl polyester as a solute, and from about 5% to about 25% polyisocyanate.

13. Rubber having the coating obtained by the process of claim 11.

14. A rubber tire having the coating obtained by the process of claim 12.

References Cited in the file of this patent

UNITED STATES PATENTS

| | | |
|---|---|---|
| 2,525,655 | D'Ianni | Oct. 10, 1950 |
| 2,643,958 | Kleiner | June 30, 1953 |
| 2,676,164 | Charlton | Apr. 20, 1954 |
| 2,725,366 | Seeger | Nov. 29, 1955 |

UNITED STATES PATENT OFFICE
CERTIFICATE OF CORRECTION

Patent No. 2,852,413 September 16, 1958

Wilhelm Tischbein

It is hereby certified that error appears in the printed specification of the above numbered patent requiring correction and that the said Letters Patent should read as corrected below.

Column 4, line 21, claim 11, for "from" read -- about --.

Signed and sealed this 10th day of February 1959.

(SEAL)

Attest:

KARL H. AXLINE
Attesting Officer

ROBERT C. WATSON
Commissioner of Patents